(12) United States Patent
Wilfred et al.

(10) Patent No.: US 9,294,914 B2
(45) Date of Patent: Mar. 22, 2016

(54) LOCALIZED VISIBLE LIGHT COMMUNICATIONS AMONG WIRELESS COMMUNICATION DEVICES

(71) Applicant: SYMBOL TECHNOLOGIES, INC., Lincolnshire, IL (US)

(72) Inventors: Sajan Wilfred, Kollam (IN); Suresh Raj V. A., Bangalore (IN); Charles B. Swope, Coral Springs, FL (US)

(73) Assignee: Symbol Technologies, LLC, Holtsville, NY (US)

( * ) Notice: Subject to any disclaimer, the term of this patent is extended or adjusted under 35 U.S.C. 154(b) by 85 days.

(21) Appl. No.: 14/011,243

(22) Filed: Aug. 27, 2013

(65) Prior Publication Data
US 2015/0065046 A1    Mar. 5, 2015

(51) Int. Cl.
| | |
|---|---|
| H04W 12/04 | (2009.01) |
| G06F 3/041 | (2006.01) |
| H04L 29/06 | (2006.01) |
| H04W 76/02 | (2009.01) |
| H04B 10/116 | (2013.01) |
| H04M 1/725 | (2006.01) |

(52) U.S. Cl.
CPC ............... *H04W 12/04* (2013.01); *G06F 3/041* (2013.01); *H04B 10/116* (2013.01); *H04L 63/061* (2013.01); *H04M 1/7253* (2013.01); *H04W 76/023* (2013.01); *H04M 2250/22* (2013.01); *H04M 2250/52* (2013.01)

(58) Field of Classification Search
CPC .............................. G06F 3/0346; H04W 12/04
USPC ...................... 455/41.2, 41.1–41.3, 566, 457; 345/538, 207; 709/212, 227
See application file for complete search history.

(56) References Cited

U.S. PATENT DOCUMENTS

| | | | |
|---|---|---|---|
| 8,019,229 B2 | 9/2011 | Fujiwara | |
| 8,204,383 B2 | 6/2012 | Shin et al. | |
| 8,214,645 B2 | 7/2012 | Brown et al. | |
| 8,224,391 B2 | 7/2012 | Kim et al. | |

(Continued)

FOREIGN PATENT DOCUMENTS

| | | |
|---|---|---|
| EP | 1750423 B1 | 1/2008 |
| EP | 2290506 B1 | 12/2011 |

(Continued)

OTHER PUBLICATIONS

International Search Report and Written Opinion mailed Mar. 11, 2015 in counterpart PCT application serial No. PCT/US2014/049720 filed Aug. 5, 2014.

(Continued)

*Primary Examiner* — Nay A Maung
*Assistant Examiner* — Angelica M Perez

(57) ABSTRACT

A method and apparatus for monitoring a localized region of a touch screen for a plurality of sensor inputs to identify a camera profile of at least one user equipment. In response to identifying the camera profile initiating a localized visual data exchange by displaying data within a region defined by the camera profile. Data communication is initiated with the user equipment over the alternative communication. In order to maintain a secure communication the invention periodically monitors the localized region of the touch screen for the plurality of sensor inputs identified as the camera profile during the localized visual data exchange while communicating over the alternative communication network.

19 Claims, 12 Drawing Sheets

(56) References Cited

U.S. PATENT DOCUMENTS

| 2005/0265731 | A1 | 12/2005 | Keum et al. | |
|---|---|---|---|---|
| 2009/0052902 | A1 | 2/2009 | Shinokura | |
| 2011/0216049 | A1 | 9/2011 | Jun et al. | |
| 2011/0296508 | A1* | 12/2011 | Os et al. | 726/7 |
| 2012/0327013 | A1* | 12/2012 | Lee et al. | 345/174 |
| 2013/0027423 | A1 | 1/2013 | Bae et al. | |

FOREIGN PATENT DOCUMENTS

| WO | 2009/032522 | * | 3/2009 |
|---|---|---|---|
| WO | 2009032522 | A1 | 3/2009 |
| WO | 2012158255 | A1 | 11/2012 |

OTHER PUBLICATIONS

Bartoli et al., "Rainbow Crypt: Securing Communication through a Protected Visual Channel", 2011 11th International Conference on Intelligent Systems Design and Applications, Nov. 22-24, 2011, pp. 72-74.

Saxena et al., "Secure Device pairing based on a Visual Channel", 2006 IEEE Symposium on Security and Privacy, May 21-24, 2006, pp. 6-313.

Saxena et al., "Secure Device pairing based on a Visual Channel: Design and Usability", IEEE Transactions on Information Forensics and Security, Mar. 2011, pp. 28-38.

* cited by examiner

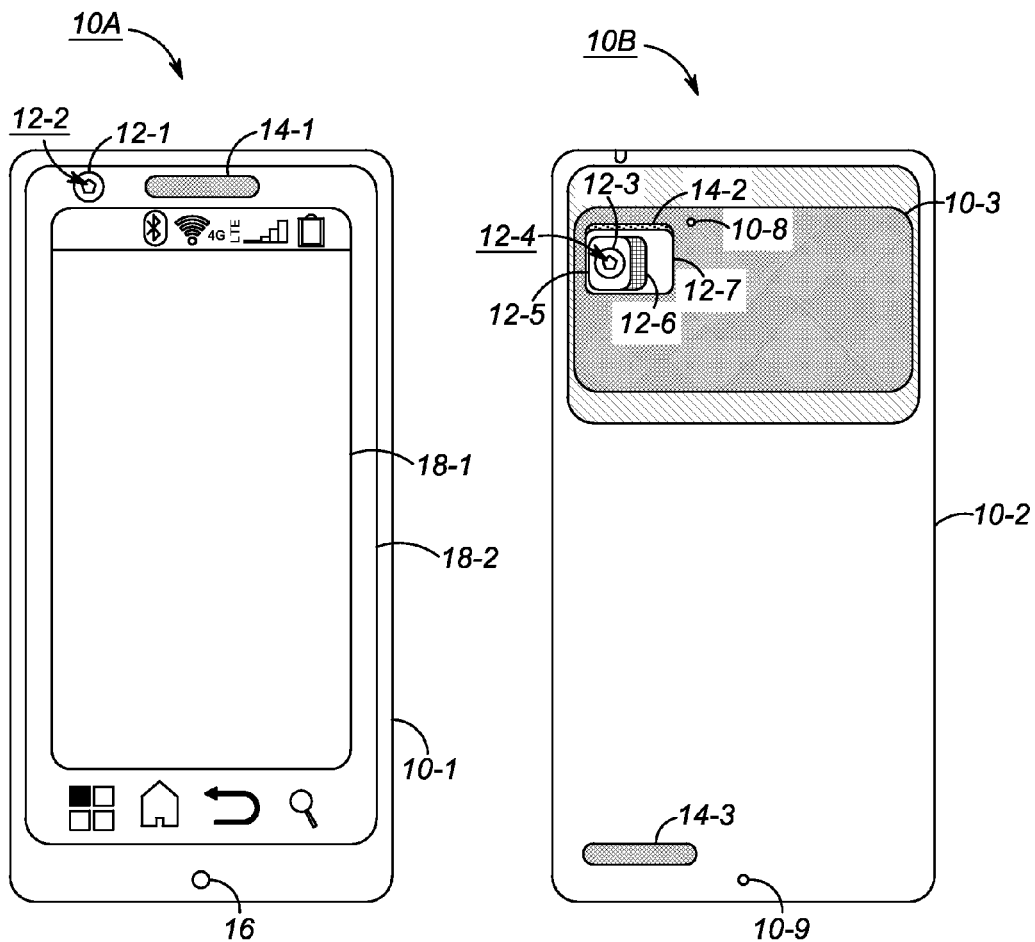
*FIG. 1*  *FIG. 2*

US 9,294,914 B2

LOCALIZED VISIBLE LIGHT COMMUNICATIONS AMONG WIRELESS COMMUNICATION DEVICES

FIELD OF INVENTION

The present invention relates to wireless data communication and touch-sensitive screens employed in electronic devices. In particular, example embodiments of the invention relate to interacting between two devices to create a secure communication channel.

BACKGROUND OF THE INVENTION

User equipment such as smart phones, tablets and laptop computing devices have evolved due to enhanced functionality, thereby becoming increasingly autonomous, ubiquitous devices. That is, unlike traditional personal computers, handheld evolved user equipment are fast becoming part of each face-to-face social interaction among users, whether the interaction is between business professionals, governmental officials, or students or whether an interaction occurs in the context of the burgeoning social media (e.g., Facebook and the like). In each face-to-face social interaction a variety of digital data may need to be exchanged among the users.

In order to allow an exchange of data among previously unassociated user equipment some type of pairing techniques is employed among devices to set up ad hoc communications. Conventional pairing techniques represent a trade-offs between complexity and security of the data exchanged. For example, Bluetooth™ personal area networks can establish relatively secure ad hoc communications among user equipment. However, pairing user equipment using this method is time consuming due to the device discovery process and exchange of PINs between previously unassociated devices. Other conventional pairing techniques providing enhanced security employ similar exchanges of seed values or PINS, as well as more complex methods using computationally intensive public key cryptography. Each of these pairing techniques providing enhanced security consumes battery power and involves varying levels of user interaction and, as such, are less user friendly, particularly among less technical savvy users.

Alternatively, conventional unsecured pairing techniques can be employed which can, for example, require one or more simple gesture sequences to initiate an exchange of data between previously unassociated user equipment. However, these convention unsecure pairing techniques are susceptible to eavesdropping in various forms and as such, are inherently insecure. For example, Bump is a popular conventional unsecure pairing technique employed for data exchange among previously unassociated user equipment. This technique requires Bump software installed on each user equipment, as well as connection to a bump server. The user transmitting data bumps his or her user equipment against the receiving user equipment to transfer the data. The bump server thereafter determines which user equipment are actually physically interacting based on each UE's reported time, location, and the measured force with which the two phones were physically bumped together. This technique is susceptible to eavesdropping by a malicious party who could observe when and where the users bump their user equipment together with an estimate of the force of the bump. Accordingly, the malicious party can submit that information to the bump server which could transfer data to the malicious party's user equipment. Other similar conventional unsecure pairing techniques utilize each user equipment's vibrator and accelerometers to create authentic sounds for identification of each user equipment for subsequent data exchange. Like bump, this pairing technique is susceptible to eavesdropping by a malicious party who could listen in on the initial pairing of devices and subsequently eavesdrop in the later communication after decrypting the vibrations.

Accordingly, there is a need for a method and computer implemented operation that would allow for localized secure transmissions among previously unassociated user equipment that is secure and user friendly.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in, and form part of, the specification and serve to further illustrate embodiments of concepts that include the claimed invention, and explain various principles and advantages of those embodiments.

FIG. 1 is an illustration of the front surface of the wireless communication device adapted for localized visual communication in accordance with some example embodiments of the invention;

FIG. 2 is an illustration of the back surface of the wireless communication device shown in FIG. 1;

Figure 3:
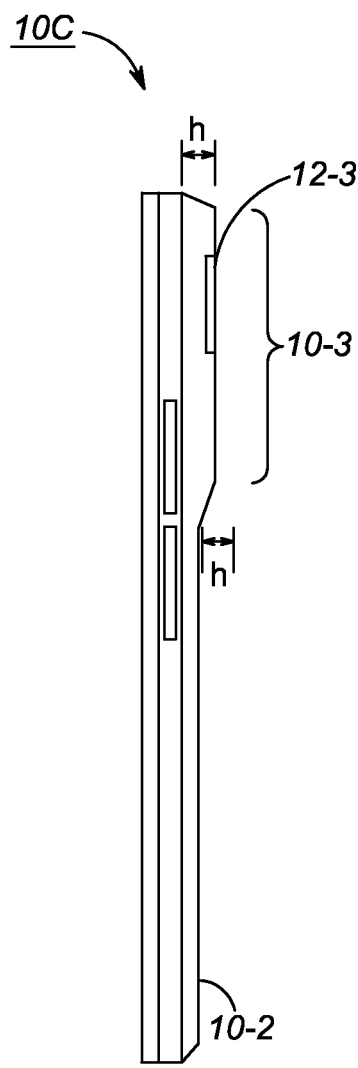
FIG. 3 is an illustration of a side view of the wireless communication device shown in FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

DETAILED DESCRIPTION OF THE INVENTION

The present invention provides methods, computer programs and an apparatuses for monitoring a localized region of a touch screen for a plurality of sensor inputs to identify a camera profile of at least one user equipment. In response to identifying the camera profile, the methods, computer programs and apparatuses initiate a localized visual data exchange by displaying data within a region defined by the camera profile. Data is initiated with the user equipment over the alternative communication. In order to maintain a secure communication the invention periodically monitors the localized region of the touch screen for the plurality of sensor inputs identified as the camera profile during the localized visual data exchange while communicating over the alternative communication network.

FIGS. 1 to 4 are illustrative examples of a wireless communication device adapted for localized visual communication in accordance with some example embodiments of the invention. That is, FIG. 1 is an illustration of the front surface of the wireless communication device 10A while FIG. 2 is an illustration of one possible back surface of the wireless communication device 10B. As shown in FIG. 1, the wireless communication device 10A includes a touch-sensitive screen 18-1 adapted to accept input from a user based on haptic inputs and/or tactile contact and output visual content (e.g., graphics, icons, text, video and/or any combination thereof) or any visual light within the visual spectrum as well as unsaturated colors. A protective glass layer 18-2 is adapted to cover the protective layer. The touch-sensitive screen 18-1 can be a resistive touchscreen panel, such as an analog resistive touchscreen, digital resistive touchscreen, an in-cell resistive touchscreen, or any other touch screen comprising a plurality of layers, including at least two thin, transparent electrically-resistive layers separated by a thin space. In another example embodiment, the touch-sensitive screen 18-1 is, an optical touchscreen, such as an infrared grid touchscreen panel, an infrared acrylic projection touchscreen panel, a rear diffused illumination touchscreen panel, a frustrated total internal reflection touchscreen panel, a laser light plane touchscreen panel, or an in-cell touchscreen panel. In yet another example embodiment, the touch-sensitive screen 18-1 is a surface acoustic wave touchscreen panel or a bending wave touchscreen panel employing dispersive signal technology or acoustic pulse recognition. In another example embodiment, the touch-sensitive screen 18-1 can also employ forced-sensing touch technology. In yet another embodiment, the touch-sensitive screen 18-1 is a multi-touch touchscreen adapted to recognize the presence of two or more points of contact on the surface of the screen.

Figure 12:
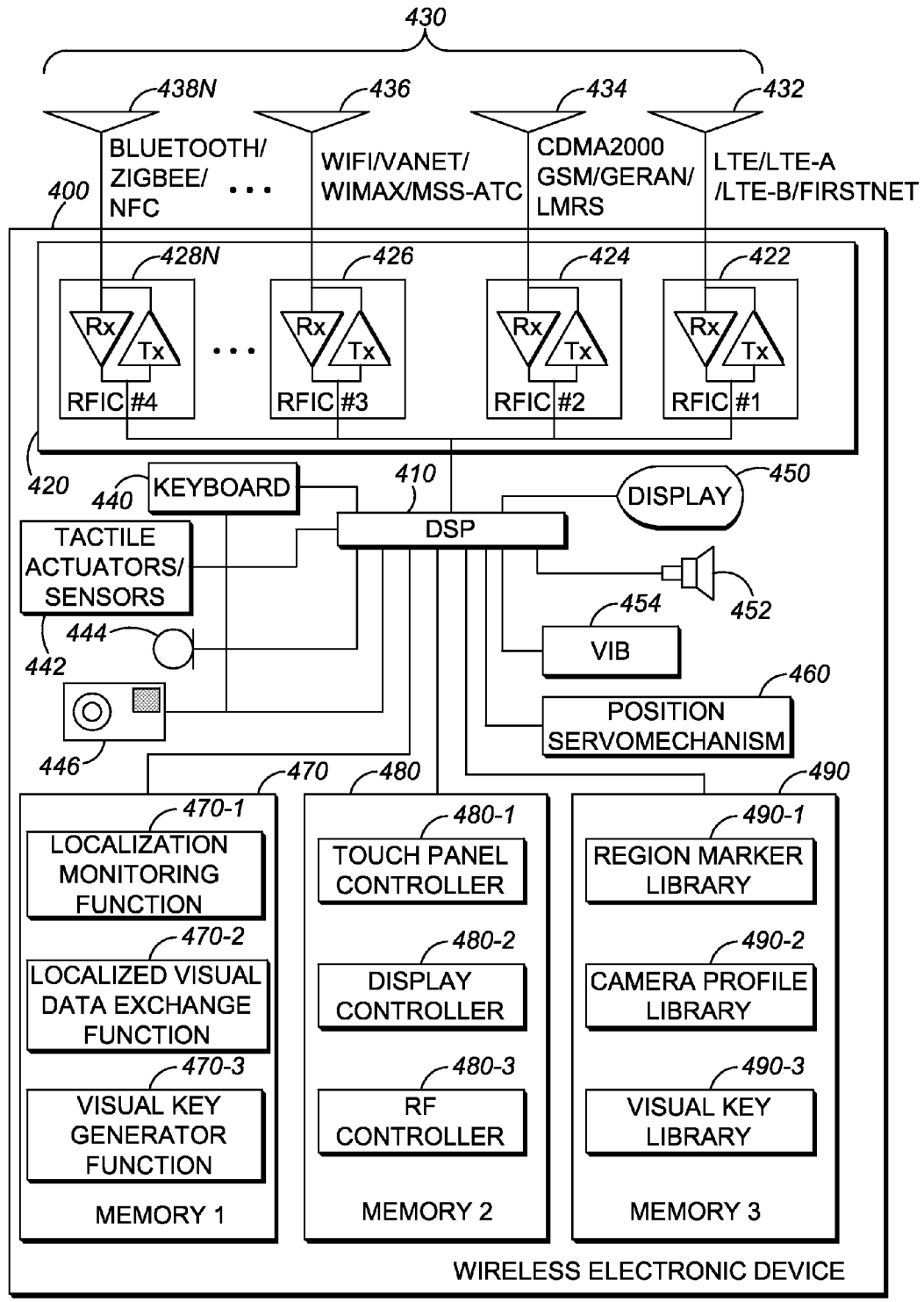
FIG. 12 is a block diagram of a wireless communication device adapted for localized visual communication in accordance with some example embodiments of the invention.

As can be appreciated by those skilled in the art, the touch-sensitive screen 18-1 is adapted to employ a Cartesian coordinate system for monitoring the position of the human finger, stylus or other object, respectively, as they are moved from one region of the screen to another. In a Cartesian coordinate system each point (e.g., position of human finger, stylus or other object) is uniquely defined in a plane by a pair of numerical coordinates in a two dimensional coordinate system (x, y). For example, a touch panel controller as described below and shown in FIG. 12 is employed for determining the position of each contact point in accordance with the Cartesian coordinate system on the touch-sensitive screen 18-1.

Also, as shown in FIG. 1, the wireless communication device 10A includes: a front bezel 10-1 which borders the touch-sensitive screen 18-1 and glass layer 18-2, a forward facing camera 12-1, a microphone 16 and a front speaker 14-1. The forward facing camera 12-1 includes an aperture 12-2 and can be adapted for near-zero distances between the camera and a planar surface (together with control of the camera's white balancing and exposure). In particular, as can be appreciated by one skilled in the art, an aperture is the opening through which light travels in an optical system, such that the aperture determines the cone angle of a plurality of rays that collimate into the camera's focal point in the image plane. Each camera has a unique aperture defined by a specific f-number which is the focal ratio of the optical system, representing the ratio of the len's focal length to the diameter of the entrance pupil. In one example embodiment, the aperture 12-2 can be adapted for near-zero distances between the camera and a planar surface (together with control of the camera's white balancing and exposure).

It should be noted before continuing that the size of touch-sensitive screen 18-1, the position of the front camera 12-1, the aperture 12-2 diameter, the position of the microphone 16 and the position of the front speaker 14-1 are but non-limiting examples for illustration purposes of example embodiments of the invention. In one non-limiting example embodiment, as shown in FIG. 1, the front camera 12-1 and the front speaker 14-1 are located above the touch-sensitive screen 18-1 and under the glass layer 18-2, and are recessed slightly below the bezel 10-1. In another example embodiment, the front camera 12-1 and the front speaker 14-1 can be located in the bezel 10-1 and can protrude above the thin layer of glass 18-2. Accordingly, in either embodiment as discussed further below, a unique camera can be detected by a touch-sensitive screen 18-1 based upon the differing locations of the front camera 12-1, aperture 12-2 and front speaker 14-1, as well as the surrounding material (e.g., solid material versus transparent material).

Referring now to FIG. 2 a rear camera 12-3 is adapted for localized visual communication in accordance with some example embodiments of the invention. A rear camera 12-3 includes an aperture 12-4 which can be adapted for near-zero distances between the camera and a planar surface (together with control of the camera's white balancing and exposure). Also shown in FIG. 2 surrounding the camera 12-3 is camera bezel 12-5, a flash unit 12-6 (to the right, outer camera plating 12-7) and a first rear speaker 14-2. Moreover, surrounding the rear camera 12-3 is a raised planar housing surface 10-3. A lower rear planar housing surface 10-2 is also shown which includes a second rear speaker 14-3. Also, shown in FIG. 2 are a first air vent 10-8 and a second air vent 10-9.

Figure 4:
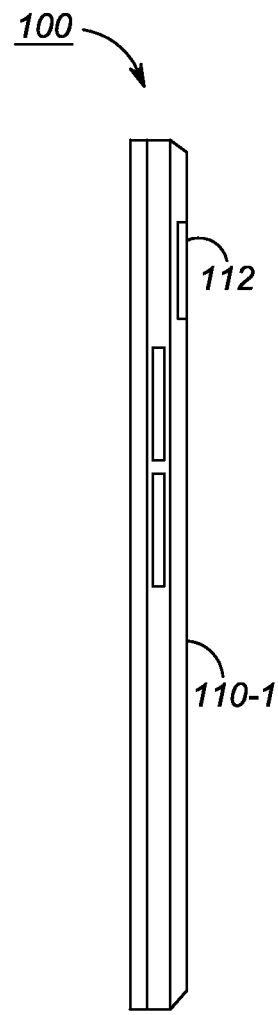
FIG. 4 is an illustration of a side view of an alternative wireless communication device configured with a flat rear planar housing surface in accordance with some example embodiments of the invention.

Referring now to FIG. 3 and FIG. 4 are two possible side views of wireless communication devices adapted for localized visual communication in accordance with some example embodiments of the invention. For example, FIG. 3 illustrates a wireless communication device 10C including a raised planar housing surface 10-3 which can be set at a predetermined height (h) above the lower rear housing surface 10-2 in accordance with the form factor of any smart phone or tablet. The rear camera 12-3 does not protrude beyond raised planar housing surface 10-3 in FIG. 3. FIG. 4 illustrates a wireless communication device 110 which has a flat rear planar housing surface 110-1 and a rear camera 112 that does not protrude beyond that surface.

The positioning of each feature (e.g., camera, flashing unit, speaker, front and back housing, bezels, etc.) in FIG. 1 to FIG. 4, such as its height, area, and location, as well as the composition type for each feature (e.g., transparent material versus solid material) cumulatively create the unique camera profile of the wireless communication device. For example, in FIG. 2 a unique camera configuration includes the height, area, location and composition of the camera bezel 12-4, flash unit 12-6, outer camera plating 12-7 and first rear speaker 14-2 together with aperture 12-4. Another example of a camera profile can represent FIG. 4, including the height, area, location and composition of the rear housing 110-1, a bezel (not shown), flash unit (not shown), outer camera plating (not shown) and one or more rear speakers (not shown), together an aperture (not shown) of camera 112. In other words, the camera profile represents the protruding elements of the front and back of the user equipment (e.g., "contact point") Accordingly, some non-limiting examples of camera profiles are a plurality of tactile feedback such as (a) a plurality of contact points representing an area of a camera aperture identified as one or more predetermined polygonal protrusions; (b) a plurality of contact points representing an area containing transparent material indicative of the camera aperture; (c) a plurality of contact points representing one or more protruding elements on the front or back of the user equipment; or (d) a plurality of contact points representing an area containing a dielectric material in contact with the touch screen.

In one example embodiment, a wireless communication device 10 is configured to detect multiple contact points on a touch-sensitive screen, such as a touch-sensitive screen 18-2 in accordance with methods and computer programs adapted for localized visual communication.

In another example embodiment, the front camera 12-1 and front speaker 14-1 could be located in the bezel 10-2 and could protrude above the thin layer of glass 18-1. Accordingly, in either embodiment as discussed further below, a unique camera provide can be detected by a touch-sensitive screen 12 based upon the differing locations of the front camera 12-1, aperture 12-2 and front speaker 16-1, as well as the surrounding material (e.g., solid material versus transparent material).

Figures 5, 6:
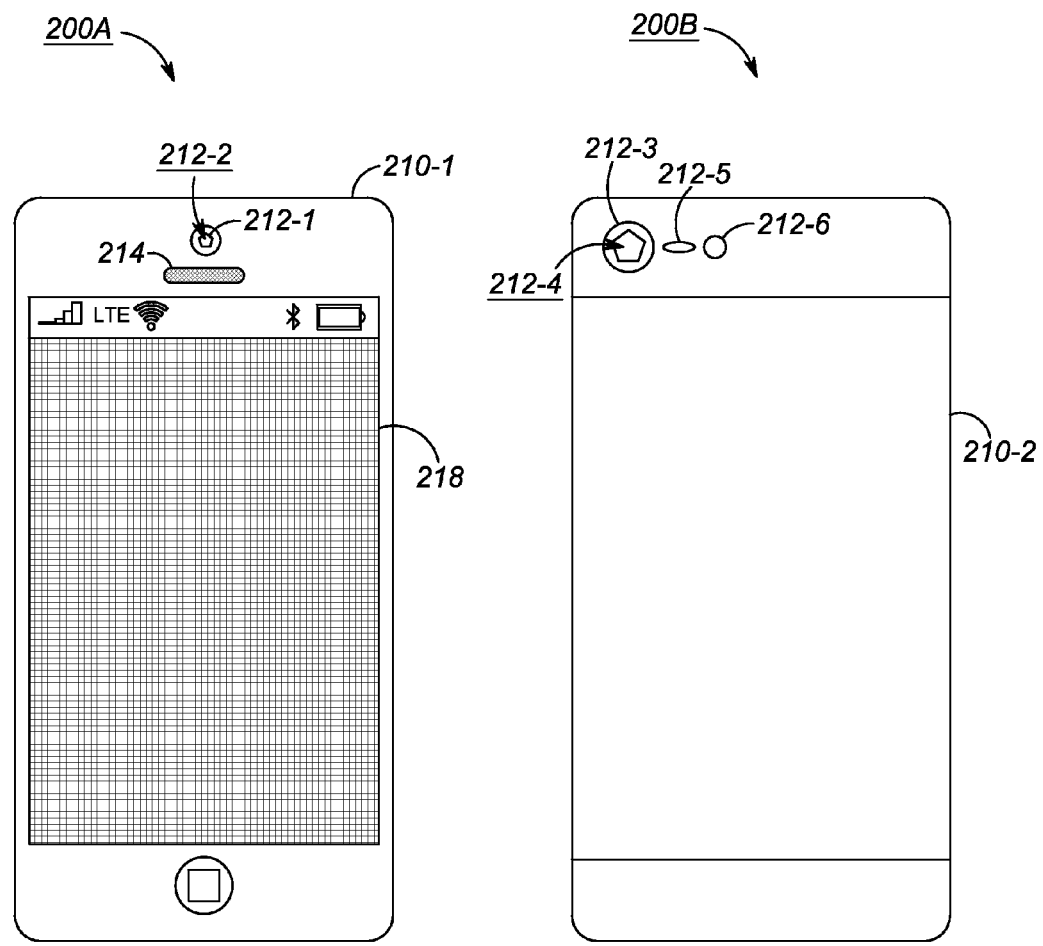
FIG. 5 is an illustration of another wireless communication device adapted for localized visual communication in accordance with some example embodiments of the invention.
FIG. 6 is an illustration of the back surface of the wireless communication device shown in FIG. 5.
Figure 7:
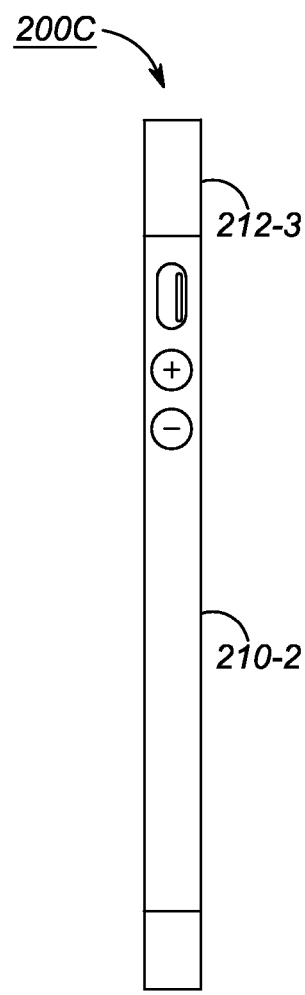
FIG. 7 is an illustration of a side view of the wireless communication device shown in FIG. 5.

FIGS. 5-7 are illustrative examples of a wireless communication device 100 adapted for localized visual communication in accordance with another example embodiment of the invention. That is, FIG. 5 is an illustration of the front surface of the wireless communication device 200A, while FIG. 26 is an illustration of one possible back surface of wireless communication device 200B. As shown in FIG. 5, the wireless communication device 200A includes a touch-sensitive screen 218 adapted to accept input from a user based on haptic and/or tactile contact and output visual content (e.g., graphics, icons, text, video and/or any combination thereof) or any visual light within the visual spectrum as well as unsaturated colors.

The depicted touch-sensitive screen 218 is a capacitive touchscreen panel (e.g., capacitive touch screen) that includes, for example, an insulator such as glass coated with a transparent conductor (e.g., indium tin oxide) and/or a touchscreen panel embodying in-cell technology. Unlike a resistive touchscreen panel (or other touch screen technologies, such as one utilizing acoustic sound wave), a capacitive touchscreen panel is primarily reactive to a "touch" from the human body. That is, the human body acts as an electrical conductor upon coming into contract with a capacitive touchscreen panel and results in a distortion of the screen's electrostatic field (i.e., a touch is a measurable change in capacitance). The touch-sensitive screen 218 can employ surface, projected, mutual capacitance technologies, as well as self-capacitance technologies.

As can be appreciated by those skilled in the art, the depicted touch-sensitive screen 18-1 is adapted to employ a Cartesian coordinate system for monitoring the position of the human finger, or capacitance stylus, or glove, respectively, as they are moved from one region of the screen to another. In a Cartesian coordinate system each point (e.g., position of human finger, stylus or glove) is uniquely defined in a plane by a pair of numerical coordinates in a two dimensional coordinate system (x, y). For example, a touch panel controller as described below and shown in FIG. 12 is employed for determining the position of each contact point in accordance with the Cartesian coordinate system on touch-sensitive screen 218.

Also, shown in FIG. 5 is a wireless communication device 200a that includes a front bezel 210-1 which borders a touch-sensitive screen 218, forward facing camera 12-1, and front speaker 214. The forward facing camera 212-1 includes an aperture 212-2 which can be adapted for near-zero distances between the camera and a planar surface (together with control of the camera's white balancing and exposure). In particular, as can be appreciated by one skilled in the art, an aperture is the opening through which light travels in an optical system such that the aperture determines the cone angle of a plurality of rays that collimate into the camera's focal point in the image plane. Each camera, as such, has a unique aperture defined by a specific f-number which is the focal ratio of the optical system representing the ratio of the lens' focal length to the diameter of the entrance pupil. In one example embodiment, the aperture 12-2 can be adapted for near-zero distances between the camera and a planar surface (together with control of the camera's white balancing and exposure).

It should be noted before continuing on, that the size of touch-sensitive screen 218, positioning of the front camera 212-1, aperture 212-2 diameter, and The position of the front speaker 214 are but non-limiting examples for illustration purposes of example embodiments of the invention. In one non-limiting example embodiment, as shown in FIG. 5, the front camera 212-1 and front speaker 214 are located above the touch-sensitive screen 218-1 and are embedded in bezel 210-1. In another example embodiment, the front camera 212-1 and front speaker 214 could be located in a touch-sensitive screen 218. Accordingly, in either embodiment as discussed further below, a unique camera profile can be detected by a touch-sensitive screen 218 based upon the differing locations of the front camera 212-1, aperture 212-2 and front speaker 214, as well as the composition of the surrounding material (e.g., solid material versus transparent material). In other words, the camera profiles represents the protruding elements of the user equipment (e.g., "contact points")

Referring now to FIG. 6 is a rear camera 212-3 adapted for localized visual communication in accordance with some example embodiments of the invention. Rear camera 212-3 includes an aperture 212-4 which can be adapted for near-zero distances between the camera and rear planar surface (together with control of the camera's white balancing and exposure). Also shown in FIG. 6 is a flash unit 12-5 located to the right of the rear camera 12-3 both of which are embedded below the rear planar housing surface 210-2. FIG. 7 shows a side view of the wireless communication device 200C and illustrates a rear planar housing surface 210-2 which can be a predetermined height (h) above the lower rear housing surface 10-2 in accordance with the form factor of a smart phone or tablet. The rear camera 212-3 does not protrude beyond the raised planar housing surface 210-2. Other example embodiments of a user equipment could include a rear camera protruding beyond a planar housing profile depending upon the form factor each device.

The positioning of each feature (e.g., camera, flashing unit, speaker, front and back housing, bezels, etc.) in FIG. 5 to FIG. 7 (such as its height, area and location), as well as the composition type (e.g., transparent material versus solid material) cumulatively create a unique camera profile of the wireless communication device. For example, in FIG. 6 a unique camera profile includes the height, area, location and composition of the camera 212-3, light sensor 212-5 and flash unit 212-6 together with aperture 212-4. In other words, the camera profiles represents the protruding elements of the user equipment (e.g., "contact points")

In one example embodiment, a touch-sensitive screen 218 is adapted to detect multiple points on the screen in accordance with methods and computer programs adapted for localized visual communication.

As mention above, the embodiment shown in FIG. 5 to FIG. 7 is limited to detecting one or more touches by the human body due to the capacitance technology employed in touch-sensitive screen 218. In the example embodiment shown of FIG. 8 to FIG. 11, a dielectric region is described and is suitable for coupling to the surface surrounding the outer aperture of a camera on a wireless communication device. In one example embodiment, coupling the dielectric regions allow a wireless communication device to be detected by a touch-sensitive screen employing capacitance technology. Accordingly, such a wireless communication device, including a dielectric region, is adapted for localized visual communication in accordance with other example embodiments of the invention.

Figure 8:
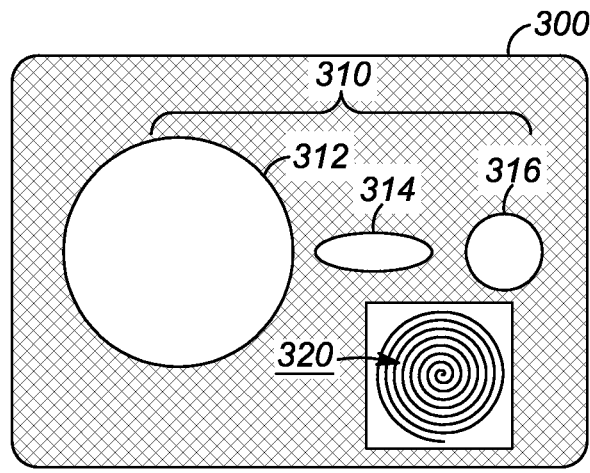
FIG. 8 is an illustration of a first dielectric region in accordance with example embodiments of the invention.

Referring now to FIG. 8, a first dielectric region 300 is illustrated which is suitable for coupling to the surface surrounding the outer aperture of a camera (and other recessed elements) on a wireless communication device in accordance with example embodiments of the invention. The first dielectric region 300 can in one possible embodiment be conductive foam, such as open-cell polyurethane foam including one or more openings 310. For example, large circular opening 312 is suitable for allowing a camera lens to protrude thorough or recess behind the first dielectric region 300. Oval opening 314 is suitable for allowing a speaker, light sensor or flash unit LED to protrude thorough or recess behind the first dielectric region 300. Similarly, small circular opening 316 is suitable for allowing a speaker, a light sensor or flash unit LED to protrude thorough or recess behind the first dielectric region 300. The one or more openings 310 shown in FIG. 8 are but one non-limiting example where openings can be arrange/located in any region of first dielectric region 300. Embedded in first dielectric region 300 are one or more conductive coils 320.

Figure 9:
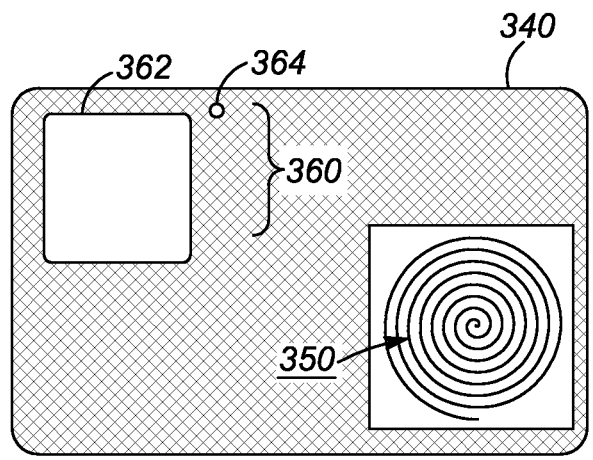
FIG. 9 is an illustration of a second dielectric region in accordance with another example embodiments of the invention.

Referring now to FIG. 9, a second dielectric region 340 is illustrated which is suitable for coupling to the surface surrounding the outer aperture of a camera (and other recessed elements) on a wireless communication device in accordance with example embodiments of the invention. Second dielectric region 340 can in one example embodiment be conductive foam, such as open-cell polyurethane foam including one or more openings 360. For example, large rectangular opening 362 is suitable for allowing a camera lens as well as a speaker and flashing unit to protrude thorough or recess behind the second dielectric region 340. Similarly, small circular opening 316 is suitable for allowing an air vent, or a speaker, or a light sensor or a flash unit LED to protrude thorough or recess behind the second dielectric region 340. The one or more openings 360 shown in FIG. 9 are but one non-limiting example where openings can be arrange/located in any region of second dielectric region 340. Embedded in first dielectric region 340 are one or more conductive coils 350.

Figures 10, 11:
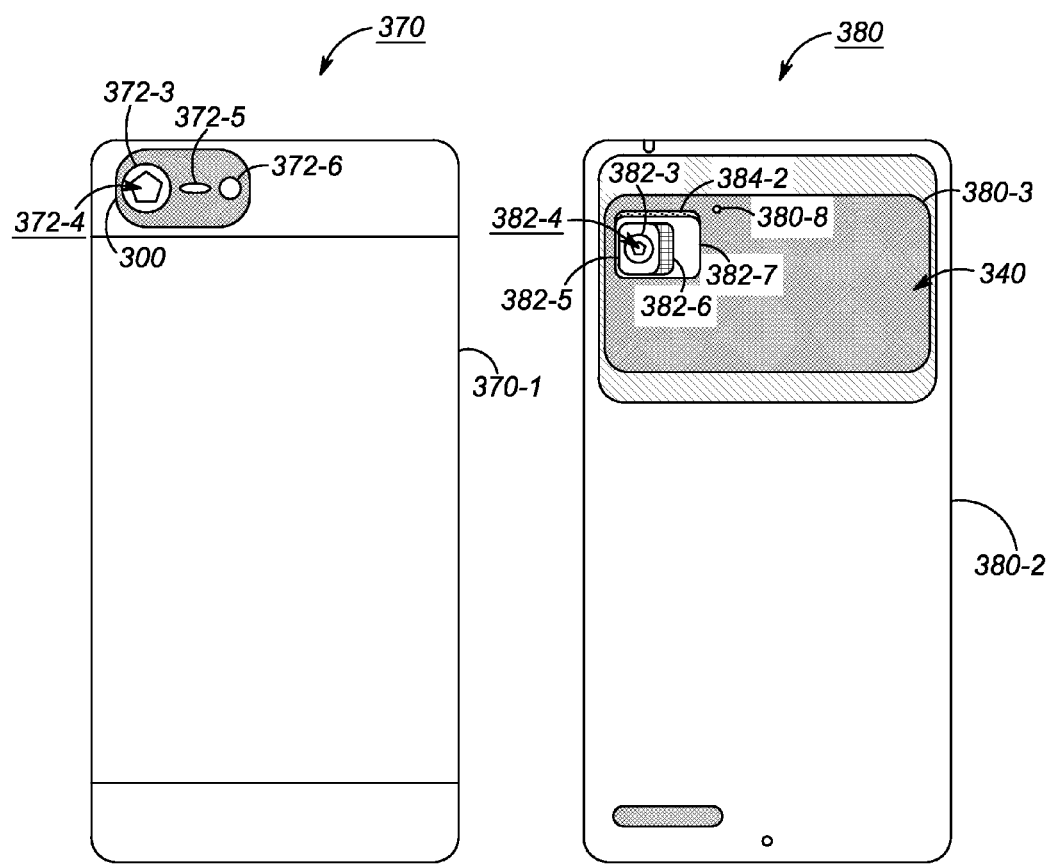
FIG. 10 is an illustration of the first dielectric region coupled to a rear planer housing of a wireless communication device in accordance with one example embodiment of the invention.
FIG. 11 is an illustration of the second dielectric region coupled to a rear planer housing of a wireless communication device in accordance with one example embodiment of the invention.

Referring now to FIG. 10 is an illustration of the first dielectric region 300 coupled to a rear planer housing 370-1 of a wireless communication device 370 in accordance with on example embodiment of the invention. As shown in FIG. 10, a rear camera 372-3, camera aperture 372-4, a light sensor 372-5 and a flashing unit 372-6 are capable of protruding thorough or recessed behind a first dielectric region 300 (e.g., by way of the one or more openings 310 shown in FIG. 8). Openings 310 allow the rear camera 372-3 and flashing unit 372-5 to be exposed (compare to FIG. 8). In one example embodiment, first dielectric region 300 is coupled to the surface surrounding the outer aperture of a camera adapted to protrude and create dialectric polarization when positioned in direct contact with a capacitive touch screen.

Referring now to FIG. 11 is an illustration of a second dielectric region 340 coupled to a raised rear planer housing 380-3 of a wireless communication device 380 in accordance with on example embodiment of the invention. As shown in FIG. 11, a rear camera 382-3, camera aperture 382-4, camera bezel 382-5, outer camera plating 382-7, flashing unit 382-6, air vent 380-8 and rear speaker 384-2 are capable of protruding thorough or recessed behind second dielectric region 340 (e.g., by way of the one or more openings 360 shown in FIG. 9). In one example embodiment, second dielectric region 340 is coupled to the surface surrounding the outer aperture of a camera adapted to protrude and create dialectric polarization when positioned in direct contact with a capacitive touch screen.

Referring now to FIG. 12, a wireless communication device (WCD) 400 is shown in accordance with some example embodiments of the invention. WCD 100 includes at least one processor or one or more processing devices, such as at least one digital signal processor (DSP) 410. DSP 410 can be a microcontroller, microprocessor or field programmable gate array or the like.

Also included is at least one computer-readable memory tangibly embodying a program of instructions executable by WDC 400. For example, a program storage device may be readable by a machine, tangibly embodying a program of instructions executable by the machine for causing performance of operations. As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic devices (such as a processor with one or more software components such as program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

For example, a first computer-readable memory 470 stores a plurality of computer programs, such as a method, program of function for monitoring a localized area of a touch-sensitive screen 470-1 in accordance with example embodiments of the invention. In one example embodiment, monitoring a localized area of a touch-sensitive screen 470-1 includes identifying a unique camera profile among a plurality of camera profiles in camera profile library 490-2 stored in a third computer-readable memory (490). In accordance with this embodiment, monitoring a localized area of a touch-sensitive screen 470-1 is adapted to employ tactile actuators/sensors 442, as well as execute touch panel controller 480-1 stored in the second computer-readable memory (480). For example, tactile actuators/sensors 442 receive a plurality of contact points (inputs) that touch panel controller 480-1 (along with DSP 410) compares to one or more camera profiles stored in camera profile library 490 in the third computer-readable memory (490). As described above and shown in FIGS. 1 to 11, a camera profile can describe one or more of the following: (1) possible contact points representing an area of a camera aperture identified as one or more predetermined polygonal protrusions; (2) possible contact points representing other elements of a wireless communication device, such non-limiting examples include a speaker, camera bezel, planar rear or front housing each protruding and making contact with a touch-sensitive screen; and (3) possible contact points representing an area containing a dielectric material in contact with the touch-sensitive screen (e.g., FIG. 8 to FIG. 10). Finding a match between the plurality of contact points and a camera profile in a camera profile library 490-2 would indicate that a second wireless communication device is in physical contact with WDC 400.

In yet another embodiment, one or more camera profiles can be dynamically created by image recognition. For example, a snap shot image or record a video stream can be created of the surface of a receiver camera on a receiving user equipment. In one embodiment, a transmitting user equipment can be adapted to take a snap shot image or record a video stream by way of its front facing camera. Accordingly, the position of receiving camera with respect to other components on the surface (e.g., the flashing unit, light sensor, or rear speaker, etc.) can be estimate by image recognition from the snap shot image or video stream.

Figure 13:
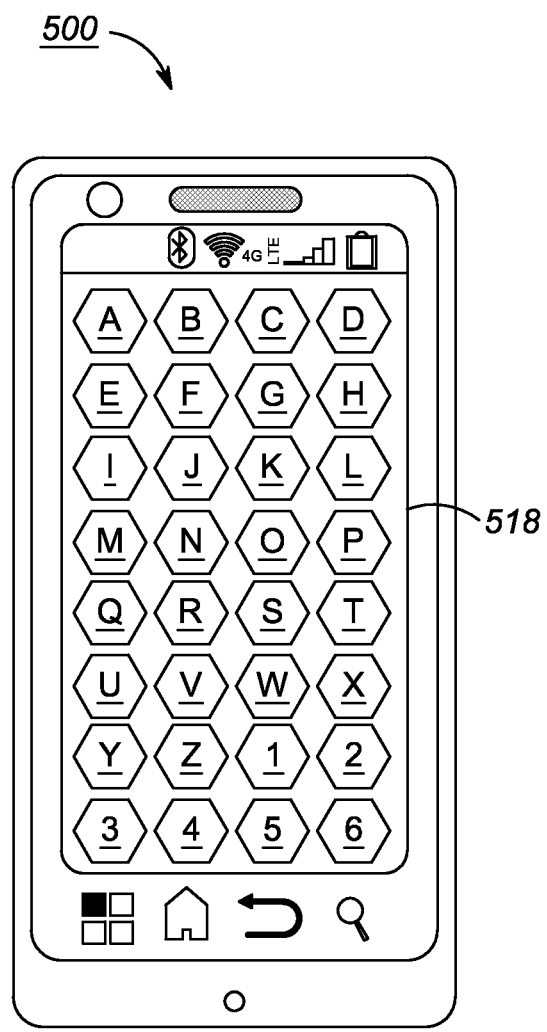
FIG. 13 is an illustration of examples of a plurality of regions on a touch-sensitive screen for locating a region marker and/or for providing a location for a subsequent visual data exchange in accordance with one example embodiment of the invention.

In one example embodiment, a region maker is selected from region maker library 490-1 stored in a third computer-readable memory 490. The selected region marker is shown on display 450 by way of display controller 480-2 and DSP 410 in a predetermined region of that display suitable for indicating a localized region suitable for visual data exchange between WDC 400 and a second wireless communication device. Display 450 is a standard definition or high definition display couple to touch-sensitive panel or screen. FIG. 13 provides numerous non-limiting examples of a plurality of regions (A to Z, 1 to 6) on a touch-sensitive screen 518 where a region marker can be located as well as a location for a subsequent visual data exchange. In one embodiment, a visual data exchange application is executed which can display the region marker. In one optional embodiment, a security password would first be required to be entered in alphanumeric keyboard 440. Alternatively, voice recognition software nativity deployed in WDC 400 (and not shown in FIG. 12) could sample the voice of one or more users by way of microphone 444 prior to allowing a visual data exchange application to execute. In another example embodiment, the region marker could be a QR code which could direct the second wireless communication device to a remote server for authentication prior to proceeding to localized data exchange. In yet another embodiment, a region marker Seeing-is-Believing (SiB) channel is implemented as a visual channel that represents security-relevant information unique to WCD 400.

In another example embodiment, a position servomechanism 460 could be activated together with tactile actuators/sensors 442, as well as a touch panel controller 480-1 and DSP 410 to guide a second wireless communication device to a localized region suitable for visual data exchange. In one example embodiment, a plurality of recorded messages could be played on a speaker 452, indicating to a user a direction to follow to find a region of the display screen. For example, the recorded messages could include the following: "move to the right," "move to the left," "move up," or "move down." In other words, the recorded messages would direct the user to the specific region of the touch-sensitive screen to couple the second user equipment. In another example embodiment a vibration unit 454 can vibrate WCD 400 until such time a particular region of a touch sensitive screen is located by a second wireless communication device. In yet another embodiment, a display 450 can flash various colors indicating the location of a region of the touch-sensitive screen (e.g., green user is over region, yellow user is close, red user is far from region). In yet another embodiment, a servomechanism is adapted to automatically align the receiver user equipment to the transmission area in response to detecting feedback from one or more magnet (not shown) by way of one or more magnetic sensors (not shown). For, example, in this embodiment both transmitting and receiving user equipment are equipped with electromagnets each adapted such that their polarization is varied and controlled by DSP 410 (and detectable by one or magnetic sensors). Accordingly, in this embodiment, electromagnetic feedback would guide a user as they "drag" each user equipment over one another. That is, directing the user into a correct position till transmitting display source and receiving image sensors are aligned. In one embodiment, the display or either user equipment is adapted to flash red when far away from the position, yellow when close to the position and green when over the correct position. Alternatively, an audible message can be selectively played or either user equipment can selectively beep or vibration to alert the user to it proximity to the correct position.

As mentioned above, WDC 400 includes a localized visual data exchange function 470-1 stored in first memory 470. After a second wireless communication device is located in a predetermined region of a touch-sensitive screen (e.g., A-Z, 1 to 6, shown in FIG. 13) a visual data exchange can occur between WDC 400 and that device to generate a secure key for use on an out-of-band communication (OBB). For example, visual key generator function 170-3 stored in first computer-readable memory 470, together with DSP 410, can be executed to select a private key among keys stored in a key library 490-3. Visual keys stored in visual key library 490-3 include a list of known wireless communication devices, alternative networks, as well as connective information for communication on an OBB channel on one or more of those alternative networks with a second wireless communication device. In another example embodiment, visual key library 490-3 includes the type of broadband network (e.g., Wi-Fi, WiMAX, CDMA2000, VANET, Bluetooth, Zigbee and the like) and WPC 400 IP address and other relevant connectivity information such TCP/IP network configuration values, dynamic host configuration protocol values and domain name system setting and the like required for attachment to each respective broadband network.

Once a visual key is generated it is then transmitted to the second wireless device in a visual communication channel by way of display 450 or a flashing unit or a status light emitting diode (LED) to a camera (not shown) located in the second wireless device. That is, the display 450 transmits one or more frames of color C from an RGB palette where each individual color is spaced at a predetermined distance. Camera 446 is a high resolution high definition camera or other image sensor which is adapted to detect a predetermined distance among one or more frames of color C from an RGB palette transmitted from second wireless communication device in one embodiment where both WDC 400 and that device are configured for dual visual communication.

In yet another embodiment, modulating and sending data between a transmitting and receiving user equipment can be by way of a monochrome source that is adapted to turned on or off at predetermined time duration (e.g., milli-seconds or microseconds). Further, the duration of such pulses can encode data to be transmitted. In one example embodiment, a black image can be rendered on a display with one or more pixels selectively turned to white while the backlight is turned on/off at specific duration. Accordingly, the duration of white pulses turning on and off can encode the data to be transmitted.

WCD 400 also includes, for example, at least one transceiver module 420 adapted for transmission and reception of wireless signals by way of one or more internal or external antennas, such as antenna 430 and RF controller 180-3. In one non-limiting example embodiment, transceiver module 420 transmits and receives signals over a long term evolution (LTE) network, or LTE-advanced (LTE-A) network, or LTE-Beyond (LTE-B) network, or on a FirstNet network on a first radio frequency module (RFIC) 422 by way of antenna 432. In another non-limiting example embodiment, transceiver module 420 transmits and receives signals over a Global System for Mobile Communication (GSM) network, or a GSM Evolution (EDGE) Radio Access Network (GERAN), or a CDMA2000 network, or a land mobile radio system (LMRS) network, or other public land mobile radio or private land mobile radio system on a second RFIC 424 over antenna 434. In another non-limiting example embodiment, a transceiver module 420 transmits and receives signals over a Wi-Fi local area network (WILAN), or a vehicle area network (VA-NET), or a WiMAX network or mobile satellite service (MSS) ancillary terrestrial components (ATC) on a third RFIC 426 over antenna 436. In yet another non-limiting example embodiment, a transceiver module 420 is adapted to transmit and receive wireless signals over a Bluetooth™ personal area network or a Zigbee personal area network or near field communication (NFC) link on a fourth RFIC 428N over antenna 438N. In another non-limiting example embodiment, a transceiver module 420 includes the means such as an additional RFIC adapted to communicate with the Global Positioning System (GPS) (not shown) for location determination. It should be noted that although FIG. 12 discloses a transceiver module 420 including four RFIC some example embodiments may optionally contain more or fewer RFICs as well as corresponding antennas. In some example embodiments no external antennas are employed by one or more RFICs as known by those skilled in the art.

WCD 100 can be a user equipment (UE) such as a cellular phone, a smart phone, a personal digital assistant, a wireless modem, a wireless communication device, a laptop computer, an LTE modem, a USB modem, a netbook, a tablet computer, an alarm console equipped with a touch-sensitive display (alarm console display), a security console equipped with a touch-sensitive display (security console display), a telematics vehicle console equipped with a touch-sensitive display (telematics vehicle display), a kiosk equipped with a touch-sensitive display (kiosk display) or a device configured to communicate with a land mobile radio system (LMRS), a public land mobile radio or private land mobile radio system, a first responders network authority (FirstNet) nationwide network (FNN), an enhanced data rates for Global System for Mobile Communication (GSM) Evolution (EDGE) Radio Access Network (GERAN), a Universal Terrestrial Radio Access Networks (UTRAN) and/or an Evolved Universal Terrestrial Radio Access (E-UTRAN) as defined by the standards pertaining to long term evolution (LTE), LTE-advance (LTE-A), as well as standards applicable to subsequently defined in future releases, such as LTE-beyond (LTE-B).

Figure 14:
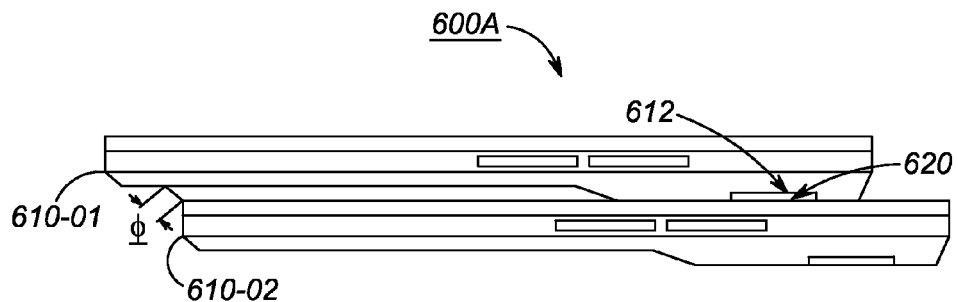
FIG. 14 is an illustration of an arrangement of a pair of wireless communication devices suitable for one-way visual data communication in accordance with one example embodiment of the invention.
Figure 15:
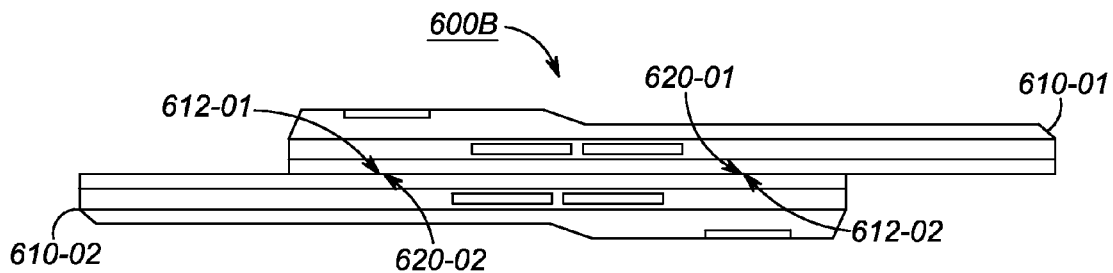
FIG. 15 is an illustration of an arrangement of a pair of wireless communication devices suitable for two-way visual data communication in accordance with one example embodiment of the invention.
Figure 16:
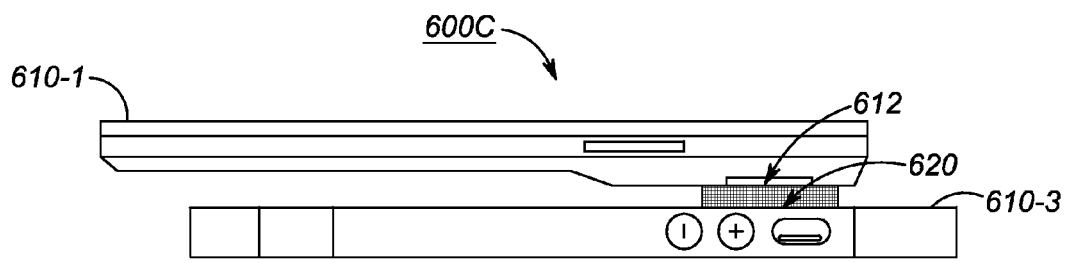
FIG. 16 is an illustration of another example arrangement of a pair of wireless communication devices employing a dielectric region where the devices are adapted for localized visual communication in accordance with example embodiments of the invention.

Referring now to FIG. 13 together with FIGS. 14 to 16, illustrations of several example arrangements of a pair of wireless communication devices adapted for localized visual communication in accordance with example embodiments of the invention are shown. For example, as shown in FIG. 14, a pair of wireless communication devices 600A (such as first user equipment 610-01 and second user equipment 610-02) are configured such that a UE 610-01 camera 612 is proximately located and in contact with a region of UE 610-02 touch-sensitive screen 620. In particular, the touch-sensitive screen 620 is detecting specific protruding contact points of UE 610-01 represented as a unique camera profile that is known to UE 610-02 (e.g., the camera profile is stored in the UE 610-02's camera profile library).

Referring now to FIG. 15, another example arrangement of a pair of wireless communication devices adapted for localized visual communication in accordance with example embodiments of the invention is shown. In particular, FIG. 15 illustrates a pair of wireless communication devices engaged in a dual visual data exchange 600B. In FIG. 15, UE 610-01 and UE 610-02 are arranged face-to-face such that the UE 610-01 camera 612-01 is proximately located and in contact with a region of the UE 610-02 touch-sensitive screen 620-02. Also, occurring at the same time, the UE 610-02 camera

620-02 is proximately located and in contact with a region of the UE 610-01's touch-sensitive screen 624-01.

Referring now to FIG. 16, an illustration is provided of another example arrangement of a pair of wireless communication devices adapted for localized visual communication in accordance with example embodiments of the invention. In particular, a pair of wireless communication devices 600C is adapted such that UE 610-03 is adapted to identify the specific contact point of UE 610-01 by way of dielectric region 340 coupled to that device to determine a specific camera profile of UE 601-01. Camera 612 is adapted to receive visual data from touch-sensitive screen 620 in a specifically identified region in accordance with one or more example embodiments of the invention.

In one example embodiment, a pair of wireless communication devices, such as UE 610-01, 610-02 and/or 610-03, are adapted such that a transmitting device is adapted to identify the specific contact point of a receiving device and to determine a specific camera profile of the receiving device. Subsequent to determining and receiving the camera profile, the transmitting device knows the exact location of the aperture of receiving device's camera. As such, a visual data exchange can commence upon the determination of the location of the camera aperture.

In an alternative embodiment, a pair of wireless communication devices UE 610-01, 610-02 and/or 610-03 are adapted so that a receiving device is adapted to direct the transmitting device to a specific region of a transmitting device's touch-sensitive screen. In other words, as described above and shown in FIG. 12, a servomechanism is employed to direct a receiving device to the specific region of the transmitting device's touch-sensitive screen.

Figure 18:
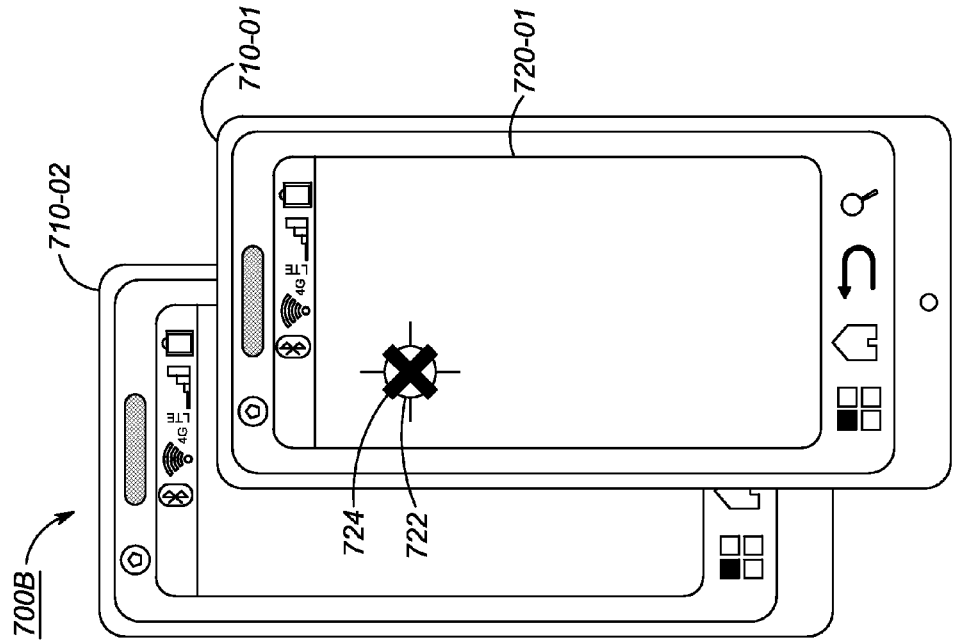
FIG. 18 is an example illustration of a method and/or computer program adapted to identify a specific region of a touch-sensitive screen for data communication where a user has adaptive position user equipment to a region marker in accordance with example embodiments of the invention.
Figure 17:
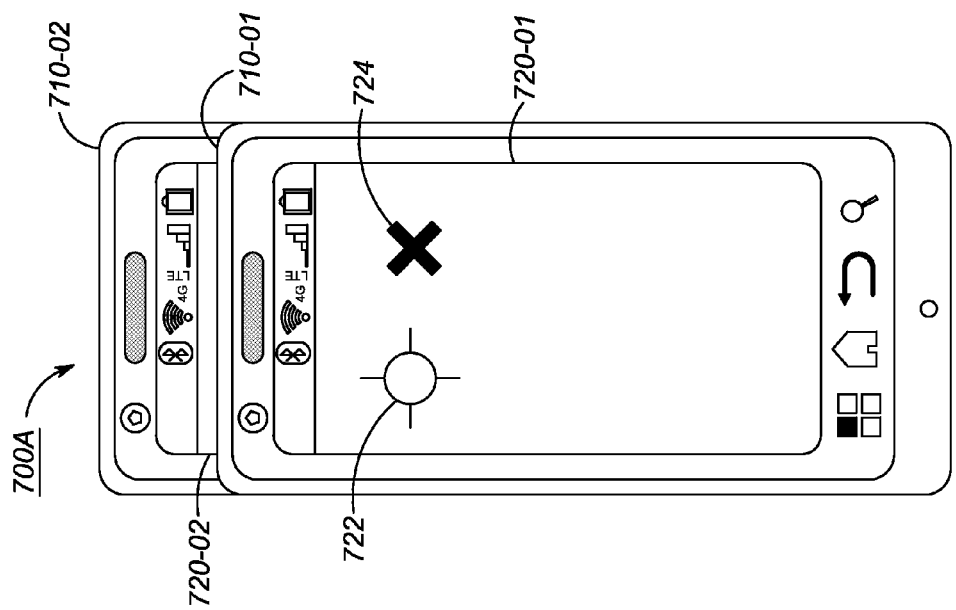
FIG. 17 is an example illustration of a method and/or computer program adapted to identify a specific region of a touch-sensitive screen for data communication where on screen instructions are provided to a user to find a region marker in accordance with example embodiments of the invention.

Referring now to FIGS. 17 and 18 is an illustration of an alternative example embodiment of the invention. As shown in FIG. 17 user equipment 710-01 and 710-02 are arranged similar to the arrangement shown in FIG. 14. That is the two UE 710-01 camera (not shown) are proximately located and in contact with a region of UE 710-02 touch-sensitive screen 720. After positioning the camera and touch-sensitive screen 720 a region view finder 722 and a region maker 724 shown as an X are displayed on the screen. The region finder 722 and region marker 724 are rendered as a result of a wireless feedback channel previously established between the two devices over an alternative network. An alternative network can be any of the radio frequency access technologies shown in FIG. 12 (Blutooth™, Zibee, NFC, wIfI, vanet, WiMAX, MSS-ATC, CDMA2000, GSM/GERAN, LMRS, LTE/LTE-A/LTE-B or FirstNet). As shown in FIG. 18 a user can move UE 710-01 such that the view finder 722 is positioned over the region marker 724 thereby positioning the camera over the specific region of touch-sensitive screen 720. Thereafter data communication can commence between the two devices in a secure manner.

Figure 19:
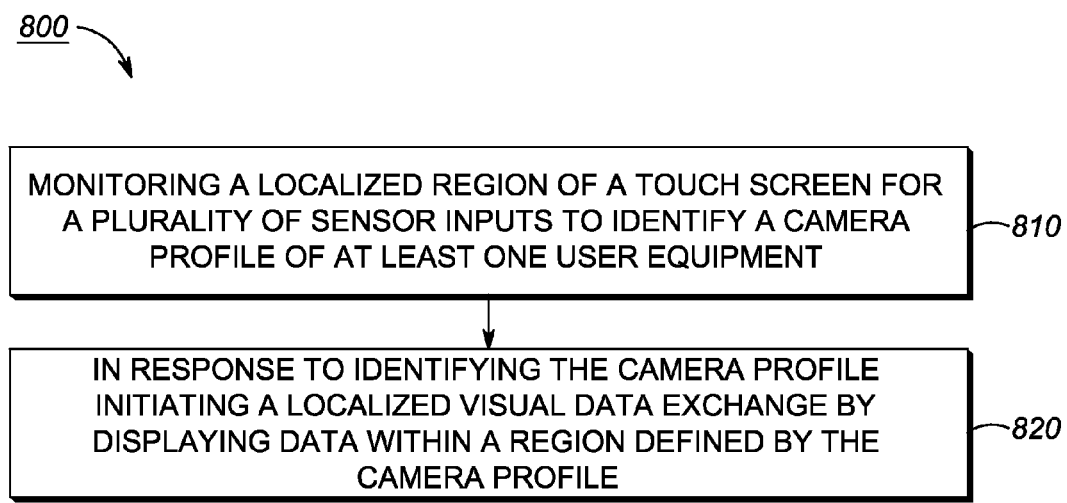
FIG. 19 is a logical flow diagram that illustrates and describes a method of localized visual communication in accordance with some example embodiments of the invention.

Referring now to FIG. 19, a logical flow diagram is shown that illustrates and describes a method and/or computer program tangible embodied in computer program instructions for monitoring a localized region of a touch screen for a plurality of sensor inputs to identify a camera profile of at least one user equipment (710). In response to identifying the camera profile initiating a localized visual data exchange by displaying data within a region defined by the camera profile (720).

In one embodiment, the method provides that the camera profile is selected from the group consisting of: (1) a plurality of contact points representing an area of a camera aperture identified as one or more predetermined polygonal protrusions; (2) a plurality of contact points representing an area containing transparent material indicative of the camera aperture; (3) a plurality of contact points representing one or more protruding elements on the front or back of the user equipment; or (4) a plurality of contact points representing an area containing a dielectric material in contact with the touch screen.

The method further provides the step of generating a visual shared key for initiating further secure communication over an alternative communication network and transmitting the visual shared key to the user equipment. The alternative communication network is a radio frequency communication network. A radio frequency communication network includes a land mobile radio system (LMRS), public land mobile radio or private land mobile radio system, a first responders network authority (FirstNet) nationwide network (FNN), an enhanced data rates for Global System for Mobile Communication (GSM) Evolution (EDGE) Radio Access Network (GERAN), a Universal Terrestrial Radio Access Networks (UTRAN) and/or an Evolved Universal Terrestrial Radio Access (E-UTRAN) as defined by the long term evolution (LTE), LTE-advance (LTE-A) and as will be subsequently defined in future releases such as LTE-beyond (LTE-B), a WiFi network, WiMAX network, CDMA2000 network, vehicle area network (VANET), Bluetooth or Zigbee person area network, near field communication link or mobile satellite service (MSS) ancillary terrestrial components (ATC).

In yet another example embodiment, the method further comprising the step of initiating communication with the user equipment over an alternative communication and periodically monitoring the localized region of the touch screen for the plurality of sensor inputs identified as the camera profile during the localized visual data exchange while communicating over an alternative communication network, in response to failing to identify the camera profile communicating over the alternative communication network.

In another example embodiment, selecting the region for localized visual data exchange is selected from the group consisting of displaying an image marker, wherein the image marker disappears upon successful coupling of the two or more user equipment transmitting an audio message, vibrating the user equipment or flashing a one or more colors on a display, wherein coordination of the coupling of two or more user equipment results. In another example embodiment, the region for localized visual data exchange is selected in one of the following ways: (a) displaying an image marker, wherein the image marker disappears upon successful coupling of the two or more user equipment; (b) transmitting a plurality of audio messages directing a user to the region for localized visual data exchange; (c) vibrating the user equipment to indicate successful coupling of the two or more user equipment or (d) flashing one or more colors on a display indicative of successful, unsuccessful or near successful coupling of the two or more user equipment.

In another example embodiment, the method provides the further step of adaptively detecting the location of the camera aperture on the touch screen based upon the camera profile, wherein localized visual communication is dynamically restricted within a region of a transmitting user equipment's touch screen proportional to the diameter of the camera aperture.

In yet another example embodiment, the method provides the step of receiving user input indicating that localized visual communication is to be initiated.

In yet another example embodiment, a first user equipment and a second user equipment are each configured with forward facing cameras adapted to receive localized visible data.

In yet another example embodiment, the method further provides the step of transmitting an acknowledgment of receipt of the localized visual data by way of a visual communication channel.

Figure 20:
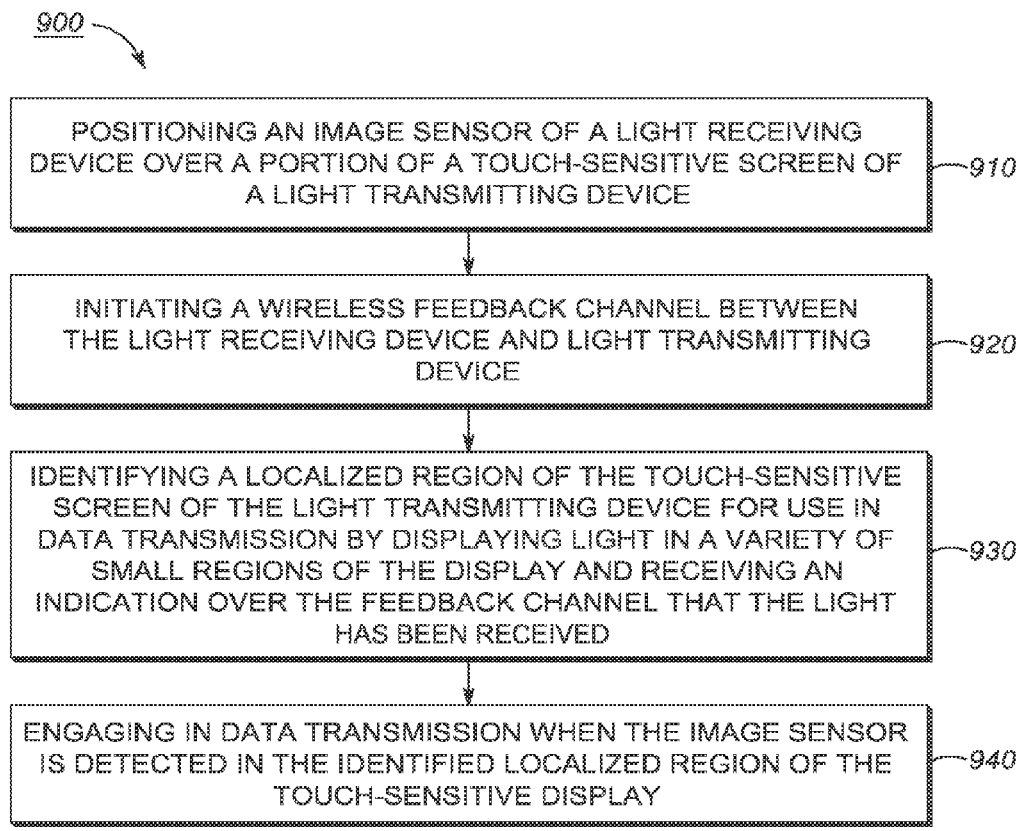
FIG. 20 is a logical flow diagram that illustrates and describes a method of localized visual communication in accordance with some example embodiments of the invention.

Referring now to FIG. 20, a logical flow diagram is shown that illustrates and describes a method and/or computer program tangible embodied in computer program instructions for positioning an image sensor of a light receiving device over a portion of a touch-sensitive screen of a light transmitting device (910). Initiating a wireless feedback channel between the light receiving device and light transmitting device (920) Identifying a localized region of the touch-sensitive screen of the light transmitting device for use in data transmission by displaying light in a variety of small regions of the display and receiving an indication over the feedback channel identifying whether the light was received (930). Engaging in data transmission when the image sensor is detected in an identified localized region of the touch-sensitive display (940). An image sensor can for example be a camera in accordance with example embodiments.

In one example embodiment, the alternative network is a radio frequency communication network. A radio frequency communication network includes a land mobile radio system (LMRS), public land mobile radio or private land mobile radio system, a first responders network authority (FirstNet) nationwide network (FNN), an enhanced data rates for Global System for Mobile Communication (GSM) Evolution (EDGE) Radio Access Network (GERAN), a Universal Terrestrial Radio Access Networks (UTRAN) and/or an Evolved Universal Terrestrial Radio Access (E-UTRAN) as defined by the long term evolution (LTE), LTE-advance (LTE-A) and as will be subsequently defined in future releases such as LTE-beyond (LTE-B), a WiFi network, WiMAX network, CDMA2000 network, vehicle area network (VANET), Bluetooth or Zigbee person area network, near field communication link or mobile satellite service (MSS) ancillary terrestrial components (ATC).

In one embodiment, identifying the localized region of the touch-sensitive display provides that a camera profile is detected and selected from the group consisting of: (1) a plurality of contact points representing an area of a camera aperture identified as one or more predetermined polygonal protrusions; (2) a plurality of contact points representing an area containing transparent material indicative of the camera aperture; (3) a plurality of contact points representing one or more protruding elements on the front or back of the user equipment; or (4) a plurality of contact points representing an area containing a dielectric material in contact with the touch screen.

In yet another embodiment in response to detecting movement of at least one user equipment, dynamically changing and maintaining a communication channel by shifting the localized region, provided a receiving camera or a receiving user equipment remains in contact with a transmitting user equipment's valid display area.

In another example embodiment, position of the light receiving and light transmitting devices for selecting a region for data communication is selected from the group consisting of displaying an image marker, wherein the image marker disappears upon successful coupling of the two or more user equipment transmitting an audio message, vibrating the user equipment or flashing a one or more colors on a display, wherein coordination of the coupling of two or more user equipment results. In another example embodiment, the region for localized visual data exchange is selected in one of the following ways: (a) displaying an image marker, wherein the image marker disappears upon successful coupling of the two or more user equipment; (b) transmitting a plurality of audio messages directing a user to the region for localized visual data exchange; (c) vibrating the user equipment to indicate successful coupling of the two or more user equipment or (d) flashing a one or more colors on a display indicative of successful, unsuccessful or near successful coupling of the two or more user equipment.

In another example embodiment, position of the light receiving and light transmitting devices includes rendering a view finder and region marker on the touch-sensitive screen of the light receiving device to adaptive change the locations of the view finder and region marker selectively in response to a user moving the devices.

In yet another example embodiment, the method further comprising the step of periodically monitoring the localized region of the touch screen for the plurality of sensor inputs identified as the camera profile during data communicating over an alternative communication network. In response to failing to identify the camera profile communicating over the alternative communication network the data link is terminated.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
monitoring, by a device, a localized region of a touch screen for a plurality of sensor inputs to identify a camera profile of at least one user equipment,
in response to identifying the camera profile initiating a localized visual data exchange by displaying data within a region that is a portion of the touch screen as defined by the camera profile with said region depending upon the camera profile wherein the camera profile comprises a plurality of contact points representing an area of a camera aperture identified as one or more predetermined polygonal protrusions.

2. A method comprising:
monitoring, by a device, a localized region of a touch screen for a plurality of sensor inputs to identify a camera profile of at least one user equipment;
in response to identifying the camera profile initiating a localized visual data exchange by displaying data within a region defined by the camera profile;
wherein the camera profile is selected from the group consisting of:
a plurality of contact points representing an area of a camera aperture identified as one or more predetermined polygonal protrusions;
a plurality of contact points representing one or more protruding elements on the front or back of the at least one user equipment;
or a plurality of contact points representing an area containing a dielectric material in contact with the touch screen.

3. The method of claim 2, further comprising the step of:
generating a visual shared key for initiating further secure communication over alternative communication network; and
transmitting the visual shared key to the at least one user equipment.

4. The method of claim 3, where the alternative communication network is a radio frequency communication network.

5. The method of claim 4, further comprising the step of:
initiating communication with the user equipment over the alternative communication network; and
periodically monitoring the localized region of the touch screen for the plurality of sensor inputs identified as the camera profile during the localized visual data exchange while communicating over the alternative communication network, in response to failing to identify the camera profile communicating over the alternative communication network.

6. The method of claim 5, further comprising the step of:
in response to detecting movement of the at least one user equipment, dynamically changing and maintaining a communication channel by shifting the localized region, provided a receiving camera or a receiving user equipment remains in contact with a transmitting user equipment's valid display area.

7. The method of claim 2, wherein the region for the localized visual data exchange is selected from the group consisting of:
displaying an image marker, wherein the image marker disappears upon successful coupling of two or more user equipment;
transmitting a plurality of audio messages directing a user to the region for localized visual data exchange;
vibrating the at least one user equipment to indicate successful coupling of two or more user equipment; or
flashing a one or more colors on a display indicative of successful, unsuccessful or near successful coupling of two or more user equipment.

8. The method of claim 2, further comprising the step of:
adaptively detecting the location of the camera aperture on the touch screen based upon the camera profile, wherein localized visual communication is dynamically restricted within a region of a transmitting user equipment's touch screen proportional to the diameter of the camera aperture.

9. The method of claim 2, further comprising the step of:
receiving user input indicating that localized visual communication is to be initiated.

10. The method of claim 2, wherein a first user equipment and a second user equipment are each configured with forward facing cameras adapted to receive localized visible data.

11. The method of claim 10, further comprising the step of:
transmitting an acknowledgment of receipt of the localized visual data by way of a visual communication channel.

12. An apparatus, comprising:
at least one processor; and
at least one tangible memory device having stored thereon computer instructions that, when executed, cause the apparatus to:
monitor a localized region of a touch screen for a plurality of sensor inputs to identify a camera profile of at least one user equipment, in response to identifying the camera profile initiating a localized visual data exchange by displaying data within a region that is a portion of the touch screen as defined by the camera profile with said region depending upon the camera profile wherein the camera profile comprises a plurality of contact points representing an area of a camera aperture identified as one or more predetermined polygonal protrusions.

13. An apparatus, comprising:
at least one processor;
at least one tangible memory device having stored thereon computer instructions that, when executed, cause the apparatus to:
monitor a localized region of a touch screen for a plurality of sensor inputs to identify a camera profile of at least one user equipment, in response to identifying the camera profile initiating a localized visual data exchange by displaying data within a region defined by the camera profile;
wherein the camera profile is a plurality of tactile feedback selected from the group consisting of:
a plurality of contact points representing an area of a camera aperture identified as one or more predetermined polygonal protrusions;
a plurality of contact points representing an area containing transparent material indicative of the camera aperture;
a plurality of contact points representing one or more protruding elements on the front or back of the at least one user equipment; or
a plurality of contact points representing an area containing a dielectric material in contact with the touch screen.

14. The apparatus of claim 13, wherein a dielectric region is coupled to the surface surrounding the outer aperture of a camera adapted to protrude and create dielectric polarization when positioned in direct contact with a capacitive touch screen.

15. The apparatus of claim 13, wherein one or more secure keys can be communicated by way of localized visual communication for use in communicating on alternative communication network.

16. The apparatus of claim 15, wherein the at least one user equipment is selected from the group consisting of:
a cellular phone;
a smart phone;
a laptop computer;
a tablet;
an alarm console display;
a security console display;
a telematics vehicle display;
a kiosk display; or
any other wireless communication device equipped with a display screen adapted for receiving haptic inputs by way of a touch screen.

17. A program storage device readable by a machine, tangibly embodying a program of instructions executable by the machine for causing performance of operations, said operations comprising:
monitoring a localized region of a touch screen for a plurality of sensor inputs to identify a camera profile of at least one user equipment, in response to identifying the camera profile initiating a localized visual data exchange by displaying data within a region that is a portion of the touch screen as defined by the camera profile wherein the camera profile comprises a plurality of contact points representing an area of a camera aperture identified as one or more predetermined polygonal protrusions.

18. A program storage device readable by a machine, tangibly embodying a program of instructions executable by the machine for causing performance of operations, said operations comprising:
monitoring a localized region of a touch screen for a plurality of sensor inputs to identify a camera profile of at least one user equipment, in response to identifying the camera profile initiating a localized visual data exchange by displaying data within a region defined by the camera profile;
wherein the camera profile is selected from the group consisting of:
a plurality of contact points representing an area of a camera aperture identified as one or more predetermined polygonal protrusions;
a plurality of contact points representing an area containing transparent material indicative of the camera aperture;
a plurality of contact points representing one or more protruding elements on the front or back of the user equipment; or
a plurality of contact points representing an area containing a dielectric material in contact with the touch screen.

19. The program storage device of claim 18, further comprising the step of:
generating a visual shared key for initiating secure communication over alternative communication network;
transmitting the visual shared key to the at least one user equipment; and
initiating communication with the user equipment over the alternative communication.

* * * * *